United States Patent
Chen et al.

(10) Patent No.: US 11,158,862 B2
(45) Date of Patent: Oct. 26, 2021

(54) FUEL CELL WITH MULTIPLE ELECTRIC CONNECTORS

(71) Applicants: Rong-Jie Chen, New Taipei (TW); Chih Hung Lin, San Jose, CA (US)

(72) Inventors: Rong-Jie Chen, New Taipei (TW); Chih Hung Lin, San Jose, CA (US)

(*) Notice: Subject to any disclaimer, the term of this patent is extended or adjusted under 35 U.S.C. 154(b) by 0 days.

(21) Appl. No.: 17/148,573

(22) Filed: Jan. 14, 2021

(65) Prior Publication Data
US 2021/0218035 A1    Jul. 15, 2021

Related U.S. Application Data

(60) Provisional application No. 62/961,668, filed on Jan. 15, 2020.

(51) Int. Cl.
*H01M 4/86* (2006.01)
*H01M 4/90* (2006.01)
*H01M 8/0221* (2016.01)
*H01M 8/0247* (2016.01)

(52) U.S. Cl.
CPC ....... *H01M 4/8657* (2013.01); *H01M 4/9041* (2013.01); *H01M 8/0221* (2013.01); *H01M 8/0247* (2013.01); H01M 2004/8684 (2013.01); H01M 2004/8689 (2013.01)

(58) Field of Classification Search
CPC .................................................. H01M 4/8657
See application file for complete search history.

(56) References Cited

U.S. PATENT DOCUMENTS

| | | | | |
|---|---|---|---|---|
| 6,127,061 A | * | 10/2000 | Shun | H01M 12/08 429/406 |
| 2002/0102465 A1 | * | 8/2002 | Chen | H01B 1/121 429/303 |
| 2005/0031919 A1 | * | 2/2005 | Ovshinsky | H01M 4/96 429/406 |
| 2007/0090788 A1 | * | 4/2007 | Hansford | H02J 7/00036 320/107 |
| 2013/0157152 A1 | * | 6/2013 | Lanning | H01M 4/13 429/406 |
| 2019/0356031 A1 | * | 11/2019 | Takenaka | H01M 50/409 |
| 2020/0266423 A1 | * | 8/2020 | Kitagawa | H01M 50/394 |

* cited by examiner

*Primary Examiner* — Brian R Ohara
(74) *Attorney, Agent, or Firm* — Han IP PLLC; Andy M. Han

(57) ABSTRACT

A zinc-air fuel cell with multiple electric connectors includes: a case forming a space; multiple gas chambers disposed in the space; two air electrode layers disposed in the space and serving as positive electrodes for discharging; a metal layer disposed in the space and serving as a positive electrode for charging; a zinc material disposed in the space and serving as a negative electrode; multiple separators disposed in the space so that the air electrode layers, the zinc material and the metal layer are separately arranged; an electrolyte disposed in the space, capable of flowing to pass through the separators and in contact with the air electrode layers, the metal layer and the zinc material so that the air electrode layers, the zinc material and the metal layer are respectively electrically connected.

20 Claims, 12 Drawing Sheets

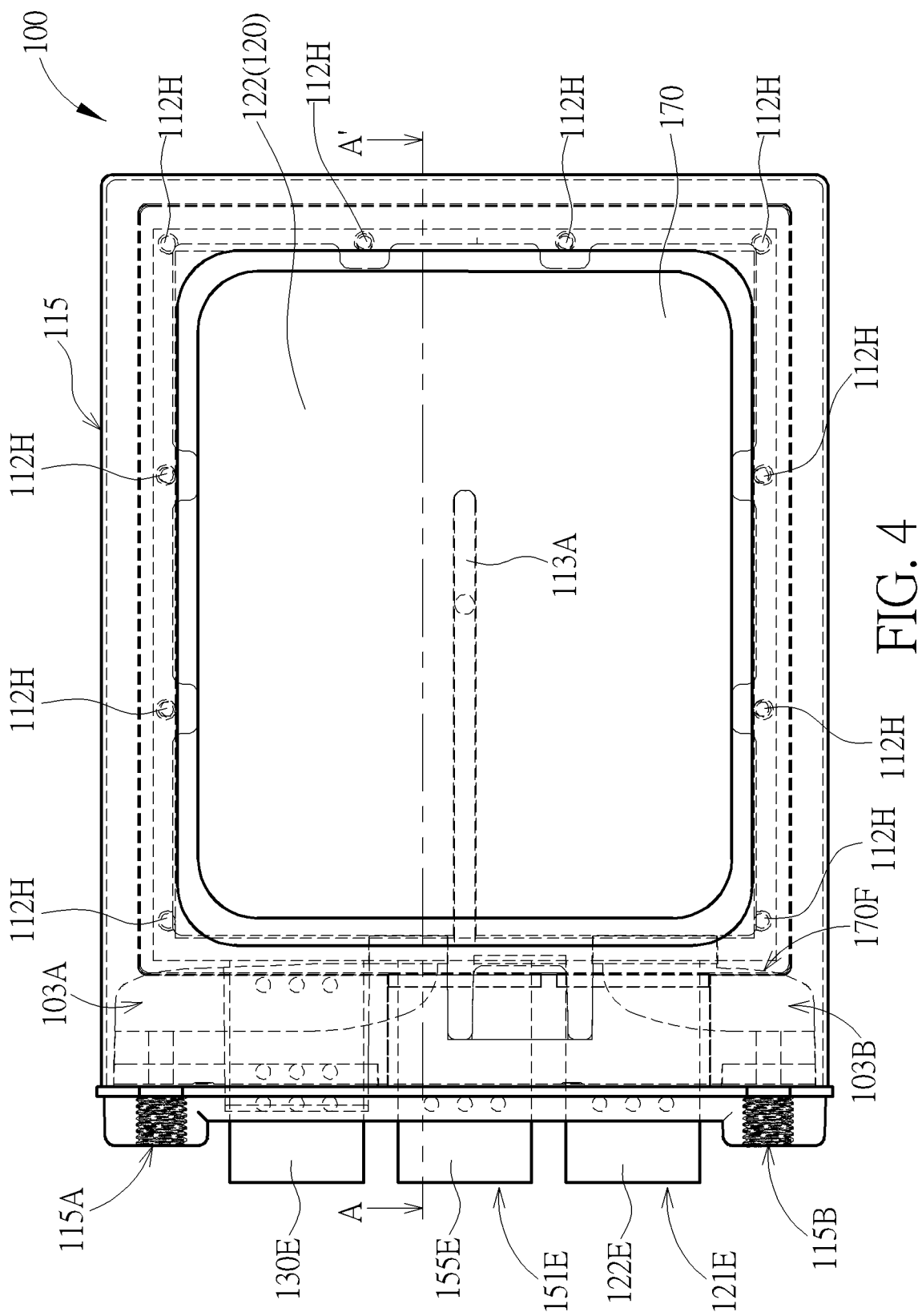

A-A'

FUEL CELL WITH MULTIPLE ELECTRIC CONNECTORS

CROSS REFERENCE TO RELATED APPLICATIONS

This application claims priority to Provisional Application No. 62/961,668, filed on Jan. 15, 2020. The contents thereof are included herein by reference.

BACKGROUND OF THE INVENTION

1. Field of the Invention

The present invention generally related to a fuel cell. In particular, the present invention is directed to an air fuel cell with multiple electric connectors and each electric connector serves as an electrode of the air fuel cell which includes zinc negative electrodes, air positive electrodes, a positive electrode for charging and an electrolyte which regulates an activated mode and a deactivated mode of the air fuel cell.

2. Description of the Prior Art

Fuel cell energy dominates a scientific field which is directed to directly converting chemical energy into electrical energy. A fuel cell has high-density energy in the process of energy generation, and the electrical energy comes from the potential difference between the positive electrode and the negative electrode, and results in little pollution to the environment at the same time. Therefore, a fuel cell is widely researched by academia and the industry to lead to revolutionary improvement to the global carbon (petrochemical) emission phenomenon, energy shortage and environmental pollution.

The internal configuration of a conventional zinc-air fuel cell (ZAFC) is mostly composed of an air electrode, a zinc anode, a liquid storage space, and an electrolyte. A conventional zinc-air fuel cell (ZAFC) is usually a manually replaceable cell. In other words, the electrodes or the electrolyte of such cell is only manually replaceable to regenerate its electric capacity. A zinc-air fuel cell may discharge or be charged. The discharge reaction may involve the following half-reactions:

The negative electrode:

$$Zn + 4OH^- \rightarrow Zn(OH)_4^{2-} + 2e^- \qquad \text{I.}$$

$$Zn(OH)_4^{2-} \rightarrow ZnO + H_2O + 2OH^- \qquad \text{II.}$$

The positive electrode:

$$\tfrac{1}{2}O_2 + H_2O + 2e^- \rightarrow 2OH^-$$

The overall reaction is:

$$Zn + \tfrac{1}{2}O_2 \rightarrow ZnO$$

The charge reaction may involve the following half-reactions:

The cathode:

$$ZnO + H_2O + 2OH^- \rightarrow Zn(OH)_4^{2-} \qquad \text{I.}$$

$$Zn(OH)_4^{2-} + 2e^- \rightarrow Zn + 4OH^- \qquad \text{II.}$$

The anode:

$$2OH^- \rightarrow \tfrac{1}{2}O_2 + H_2O + 2e^-$$

The overall reaction:

$$ZnO \rightarrow Zn + \tfrac{1}{2}O_2$$

Zinc oxide is reduced to nano-scale zinc in the presence of an alkaline electrolyte in electrolysis.

When left unused or after used for a long time, the polarization, the passivation and the dendrite growth of the zinc anode led to rapid corrosion of the zinc anode, worse performance of the zinc-air fuel cell, the acidification of the electrolyte and reduced battery life due to continuous soaking of the air electrode and of the zinc anode in the electrolyte. Although the presence of a zinc-air fuel cell structure with three electrodes is available, it fails to solve the problems such as high current recharging and discharging and redox efficiency, and the problem of leakage of a zinc air fuel cell still remains unsolved. Further, conventional fuel cells cannot effectively deal with the cycle blocking problem of single battery and multiple series and parallel batteries.

SUMMARY OF THE INVENTION

The primary object of the present invention resides in the partial or complete removal of the electrolytic solution in the cell when the zinc-air fuel cell with multiple electric connectors of the present invention is kept in an unused state, to further avoid the contact of the anode structures with the electrolytic solution to stop the electrochemical reaction and to avoid the corruption or surface peeling of the anode structures or cathode structures as well as to extend the storage life or the service life of the air fuel cell.

The secondary object of the present invention resides in the design of a zinc-air fuel cell with multiple electric connectors which have positive electrodes and negative electrodes so that a single cell itself may undergo a chemical reaction of charge or a chemical reaction of discharge at the same time without the need of manual replacement of the electrodes or electrolyte.

Another object of the present invention enables the input or output of at least one of the zinc material and the electrolytic solution through a transport device into or out of the zinc-air fuel cell with multiple electric connectors of the present invention so as to promote the replacement or the renewal operation process of the zinc material or of the electrolytic solution to double the efficiency of the operation process. The design of the zinc-air fuel cell may provide multiple gas chambers to reduce the cycle blocking problem of a single battery.

In order to achieve the above-mentioned objects, the zinc-air fuel cell with multiple electric connectors of the present invention includes:

a case forming a space;

a plurality of gas chambers disposed in the space;

two air electrode layers disposed in the space and serving as positive electrodes for discharging in a chemical reaction;

a metal layer disposed in the space and serving as a positive electrode for charging in the chemical reaction;

a zinc material disposed in the space and serving as a negative electrode to go with the air electrode layers for discharging in the chemical reaction or a negative electrode to go with the metal layer for charging in the chemical reaction;

a plurality of separators disposed in the space, respectively disposed between the air electrode layers and the metal layer so that the air electrode layers, the zinc material and the metal layer are separately arranged; and an electrolyte disposed in the space, capable of flowing to pass through the separators and in contact with the air electrode layers, with the metal layer and with the zinc material so that the air electrode layers, the zinc material and the metal layer are respectively electrically connected.

The zinc material is selected from a group consisting of flowable zinc slurry, zinc particles and a zinc plate. The embodiments of the conductive layers may be different to correspond to the selection of the zinc material. The flowable zinc slurry may be in a form of "mortar-like", such as a mixture of zinc particles, a liquid and some optional additives. The viscosity of the flowable zinc slurry is related to its circulation speed. The faster the circulation speed is, the lower the viscosity, and the slower the circulation speed is, the higher the viscosity.

Furthermore, when a flat surface for supporting the cell is used as a horizontal reference, the air electrode layers, the metal layer and the zinc material are configured to be vertically arranged with respect to the flat surface. This configuration is different from the conventional upright position of lateral arrangement. The zinc material may include a flowable zinc slurry, a zinc particle or a zinc plate.

The zinc-air fuel cell with multiple electric connectors may further include a transport device. The transport device is connected to the space and capable of outputting or inputting the electrolyte, thereby changing the height position of the electrolyte in the space. By changing the total amount of the electrolyte in the space and the internal structure which the height of a liquid may contact, the contact of the structure at a specific height with the liquid and the contact of the position in the space with the liquid may be avoided and the corruption of a specific structure or surface peeling may be prevented.

The present invention is characterized in that the zinc material of the present invention is used as a negative electrode, and the air electrode layers and the metal layer are respectively used as positive electrodes. The positive electrodes and the negative electrodes may collectively or individually form the multiple electric connectors in a zinc-air fuel cell.

In addition, the transport device connecting the space may change the total amount of the electrolyte and the liquid height of the electrolyte by removing most of the electrolyte out of the space to avoid the contact of the electrolyte with the internal structure in the space when the zinc-air fuel cell with multiple electric connectors of the present invention is in storage or not in use, to avoid the undesirable self-discharging or charging reaction of the zinc-air fuel cell with multiple electric connectors of the present invention and to avoid the corruption or surface peeling of the internal structure in the space so as to extend the storage life or the service life of the zinc-air fuel cell with multiple electric connectors of the present invention.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates a schematic diagram of a front view of an embodiment of the zinc-air fuel cell with five electric connectors of the present invention.

DETAILED DESCRIPTION

As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to". When an element or layer is referred to as being "on" or "connected to" another element or layer, it may be directly on or directly connected to the other element or layer, or intervening elements or layers may be presented. Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

Figure 1:
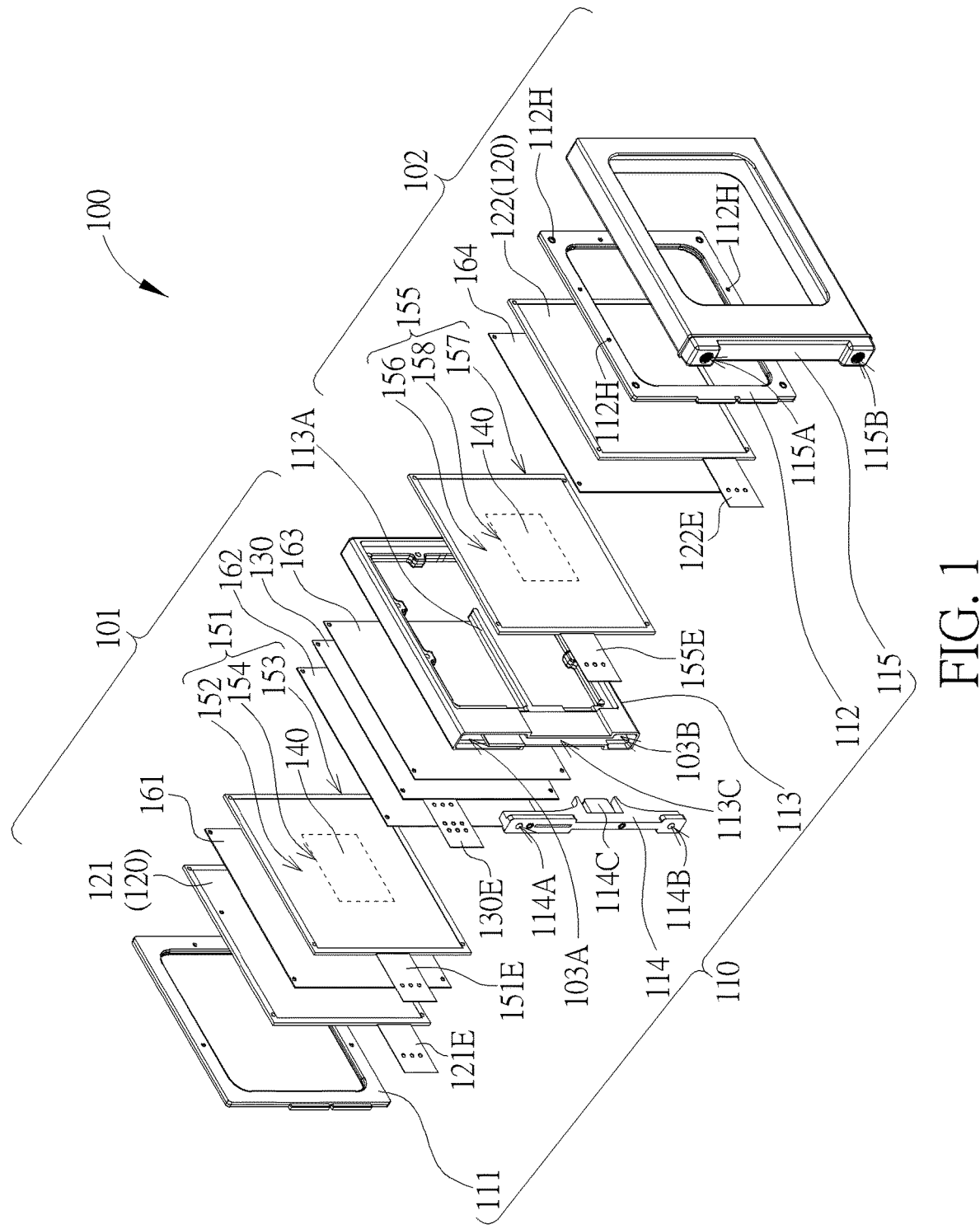
FIG. 1 illustrates a schematic diagram of an embodiment of an explosive diagram of a cell structure of the present invention.

FIG. 1 illustrates an embodiment of an explosive diagram of a cell structure with respect to the zinc-air fuel cell with five electric connectors of the present invention. For example, a cell structure 100 may have five electric connectors and include elements such as a case set 110, air electrode layers, a metal layer 130, a zinc material 140, conductive layers and a plurality of separators. The cell structure 100 may structurally have multiple portions to assemble, for example a left portion, a right portion and a central portion, but the present invention is not limited to these.

The case set 110 may include a plurality of case elements. A plurality of the case elements together may collectively form the case set 110 to serve as the cell case of the cell structure 100. For example, the case set 110 may include a first housing in the form of a frame, a second housing in the form of a frame, a third housing in the form of a frame and a fourth housing in the form of a frame, but the present invention is not limited to these. The first housing, the second housing, the third housing and the fourth housing may collectively form space to accommodate other elements of the cell structure 100, define gas chambers to buffer the input circulation or the output circulation of a fluid for use in the zinc-air fuel cell with five electric connectors and provide solid support for the cell structure 100.

For example, the first housing may be a left housing 111 in the left portion. The second housing may be a right housing 112 in the right portion. The central housing 113 may be a central housing 113 in the central portion. The case set 110 may further include a lid 114 to be connected to central housing 113 to form channels for the circulation of fluids. The fourth housing may be a case housing 115 to accommodate the left housing 111, the right housing 112, the central housing 113 and the lid 114. Each housing or lid may have a complementary structure with respect to one another, such as one or more holes for fastening two pieces of housing or of lid or for snapping up two pieces of housing or of lid, to facilitate the mutual engagement to obtain a cell structure 100 to improve the air tightness and/or the leak-proof property of the cell structure 100.

In some embodiments, the right housing 112 may have one or more holes 112H for the engagement with the case housing 115. For example, the holes 112H may help an adhesive (not shown) to temporally hold the right housing 112 and the case housing 115 together by fastening the frames of the right housing 112 and of the case housing 115. The right housing 112 and the case housing 115 may be subjected to a subsequent insert molding method to form a permanent sealed structure, such as an air-tight and/or a leak-proof cell structure, in the presence of the holes 112H and the adhesive (not shown). The left housing 111, the central housing 113, the lid 114 and the case housing 115 may have similar hole (s) for similar use, but the present invention is not limited to these. In some embodiments, two adjacent elements may have complementary components for mutual engagement. For example, the central housing 113 may have a central housing region 113C to correspond to a central lid piece 114C of the lid 114. The central housing region 113C may have a complementary recess with respect to the central lid piece 114C to facilitate the mutual engagement of the two specific parts for fastening the two elements or for snapping up the two elements, but the present invention is not limited to these.

The case set 110 may include a polyarylsulfone material to enhance the mechanical strength of the cell structure 100. For example, at least one of the left housing 111, the right housing 112, the central housing 113, the lid 114 and the case housing 115 may include the polyarylsulfone material. The polyarylsulfone material may improve the adherence of the interface between two materially different substances, for example an organic polymer and a metallic material. Further, the polyarylsulfone material may be subjected to an insert molding method to obtain one of the housings or the lid to improve the air tightness and/or the leak-proof property of the cell structure 100. The present invention may use a polyarylsulfone material-based resin as the substrate for the insert molding method to encapsulate the elements in the zinc-air fuel cell to eliminate the problem of liquid leakage in the prior art. For example, a better air tightness property may decrease the possibility of a gas leak and a better leak-proof property may decrease the possibility of an electrolyte leak. The air tightness property and/or the leak-proof property may increase a fluid sealing property or the reliability of the cell structure 100.

The polyarylsulfone material may be thermoplastics with sulfonyl groups. In some embodiments of the present invention, the polyarylsulfone material may be polysulfones (PSF, PSU), polyethersulfones (PES, PESU), polyarylethersulfones (PAES) and polyphenylene sulfones (PPSU, PPSF), but the present invention is not limited to these.

The left housing 111 along with the central housing 113 together may form a first space, for example a left space 101 in the left portion. The left space 101 may accommodate and fasten one air electrode layer, a metal layer, a zinc material, one conductive layer, multiple separators and the electrolyte 170. Similarly, the right housing 112 along with the central housing 113 together may form a second space, for example a right space 102 in the right portion. The right space 102 may accommodate and fasten one air electrode layer, a metal layer, a zinc material, one conductive layer, multiple separators and the electrolyte 170.

The central housing 113 may have a plurality of gas chambers, such as two gas chambers, for example a first gas chamber 103A and a second gas chamber 103B. The gas chambers may be disposed in the space, for example the first gas chamber 103A and the second gas chamber 103B may be disposed in the left space 101 and in the right space 102. In other words, the first gas chamber 103A, the second gas chamber 103B, the left space 101 and the right space 102 may be mutually connected in terms of accommodation to facilitate the continuous circulation of fluids for use in the air fuel cell. The first gas chamber 103A or the second gas chamber 103B may independently help buffer the fluid circulation of the zinc metal fuel.

The central housing 113 may further have a guide column 113A, disposed between the first gas chamber 103A and the second gas chamber 103B, or between the left space 101 and the right space 102 for example, to help buffer or guide the fluid circulation of the zinc metal fuel. The fluid circulation may include at least one of a gas circulation and an electrolyte circulation.

The lid 114 and the central housing 113 together may define the first gas chamber 103A or the second gas chamber 103B. The lid 114 may further have holes. For example, the lid 114 may have a first hole 114A and a second hole 114B. The first hole 114A and the second hole 114B may respectively correspond to the first gas chamber 103A and the second gas chamber 103B. The holes may allow a fluid entering or leaving the first gas chamber 103A or the second gas chamber 103B.

The case housing 115 may further have openings. For example, the case housing 115 may have a first opening 115A and a second opening 115B. The first opening 115A and the second opening 115B may respectively correspond to the first hole 114A and the second hole 114B. The openings may allow a fluid entering or leaving the cell structure 100 by passing through the first gas chamber 103A or through the second gas chamber 103B.

An air electrode set 120 may include two air electrode layers. For example the air electrode set 120 may include a left air electrode layer 121 disposed and fastened in the left space 101 and a right air electrode layer 122 disposed and fastened in the right space 102. The left air electrode layer 121 or the right air electrode layer 122 may collectively or individually serve as a positive electrode for discharge in a predetermined chemical reaction. An air electrode may serve as an anode of an air cell. An air electrode layer may include a metal mesh, a waterproof and breathable layer and a catalytic layer which are pressed together. The air electrode layer may accommodate the oxygen gas serving as a positive electrode in the air to react with the fuel (Al, Mg, Zn . . . etc.) in the negative electrode along with an electrolyte in the presence of active carbon and of a catalyst to generate electric energy.

The left air electrode layer 121 or the right air electrode layer 122 may respectively include a metallic material, such as Ni, but the present invention is not limited to this. Each air electrode layer may further have an extending strip to serve as an electric connector for the electric current. For example, the left air electrode layer 121 may have a left discharging positive electric connector 121E, and the right air electrode layer 122 may have a right discharging positive electric connector 122E.

A metal layer 130 may be disposed in one of the spaces, for example in the left space 101 or in the right space 102. FIG. 1 illustrates an embodiment of the metal layer 130 disposed in the left space 101 and between the left air electrode layer 121 and the central housing 113, but the present invention is not limited to these. The metal layer 130 may include a metallic material, such as Ni, but the present invention is not limited to this. The metal layer 130 may further include a stainless steel layer, such as a 316 stainless steel mesh. The metal layer 130 may serve as a positive electrode for charge in the chemical reaction. The metal layer 130 may further have an extending strip to serve as an electric connector for the electric current. For example, the metal layer 130 may have a charging positive electric connector 130E.

A zinc material 140 may be disposed in the spaces to serve as a chemically active negative electrode for the charge/discharge reaction. For example, the zinc material 140 may be a negative electrode to go with the air electrode layers (positive electrodes) for discharge in the chemical reaction. Or, the zinc material 140 may be a negative electrode to go with the metal layer 130 (a positive electrode) for charge in the chemical reaction. The zinc material 140 may include at least one of a flowable zinc slurry, zinc particles and a zinc plate to serve as a fuel of the zinc-air fuel cell with five electric connectors of the present invention. The flowable zinc slurry may be in a form of mortar-like, such as a mixture of zinc particles, liquids and some optional additives. The viscosity of the flowable zinc slurry is related to its circulation speed. The faster the circulation speed is, the lower the viscosity is. The liquid may include an electrolyte solution.

A conductive set may include two conductive layers disposed on two sides of the spaces, but the present invention is not limited to these. For example the conductive set may include a left conductive layer 151 disposed and fastened on the left side, i.e. in the left space 101 and a right conductive layer 155 disposed and fastened on the right side, i.e. in the right space 102. The conductive set may be disposed adjacent to the zinc material 140 or further, in contact with the zinc material 140.

In some embodiments, at least one of the left conductive layer 151 and the right conductive layer 155 may be in direct contact with the zinc material 140 to accommodate the zinc material 140. A conductive layer may have a recess to accommodate the zinc material 140. For example, the left conductive layer 151 may have a central region 152 and a peripheral region 153. The central region 152 may be lower than the peripheral region 153 to form a left recess 154. The left recess 154 may accommodate the zinc material 140 to undergo the chemical reaction. Similarly, the right conductive layer 155 may have a central region 156 and a peripheral region 157. The central region 156 may be lower than the peripheral region 157 to forma right recess 158. The right recess 158 may accommodate the zinc material 140 to undergo the chemical reaction.

One conductive layer may serve as a structural electrode to accommodate the chemically active zinc material 140 so one of the conductive layers may support the zinc material 140 to undergo the chemical reaction. Further, one of the conductive layers may serve as an electric current channel to transfer the electrons involved in the chemical reaction. The materials of the conductive layers may be electric conductive, chemically inactive and not involved in the chemical reaction. The left conductive layer 151 or the right conductive layer 155 may respectively include a metallic material, such as Ni or Cu, but the present invention is not limited to these. Each conductive layer may have an extending strip to serve as an electric connector for the electric current. For example, the left conductive layer 151 may have a left negative electric connector 151E; the right conductive layer 155 may have a right negative electric connector 155E.

The zinc-air fuel cell with multiple electric connectors of the present invention may have multiple gas chambers, for example, the first gas chamber 103A and the second gas chamber 103B. The zinc-air fuel cell with multiple electric connectors of the present invention may have advantageous multiple gas chambers for buffering purpose. In addition to the improvement of the cycling efficiency of the fuel, they may also facilitate the achievement of the function of the relative balance of the internal pressure. A conventional cell structure with three electric connectors only has the fuel cycling channel, and fails to achieve the efficiency of the balanced cycling of fuel and gas in terms of space. Such structure tends to cause excessive pressure inside the cell and results in poor circulation and in low circulation efficiency.

In the case of a zinc-air fuel cell with six electric connectors of the present invention, the gas chamber set may be divided into four gas chambers or maintain the configuration of two gas chambers. In terms of electric connectors, the configuration may be equivalent to the series or parallel connection of two zinc-air fuel cells with three electric connectors, and the design of the configuration is optional.

In terms of multiple buffering gas chambers, for example in the case of four buffering gas chambers, they come from two divided buffering gas chambers. In addition to the purpose of the adjustment of efficiency, another purpose may reside in the separate circulation of the fuel from the gas to achieve the effect of non-synchronous circulation. For example, the non-synchronous circulation may only enable the circulation of the gas to improve the discharge efficiency, or alternatively, only enable the circulation of the fuel to improve the charging or the discharging efficiency. Six or more gas chambers function similarly.

As shown in FIG. 1, a plurality of separators may be provided in the spaces. For example, a separator 161, a separator 162 and a separator 163 may be provided in the left space 101. Another separator 164 may be provided in the right space 102. In some embodiments, the separator 161, the separator 162, the separator 163 and the separator 164 may respectively include a hydrophilic separator. A separator may be disposed between two adjacent elements to segregate the two adjacent elements and an element may be disposed between two adjacent separators. For example, the separator 161 may be disposed between the left air electrode layer 121 and the left conductive layer 151, the separator 162 may be disposed between the left conductive layer 151 and the metal layer 130, the separator 163 may be disposed between the metal layer 130 and the central housing 113, and the separator 164 may be disposed between the right conductive layer 155 and the right air electrode layer 122 so that the left air electrode layer 121, the left conductive layer 151 (accommodating the zinc material 140), the metal layer 130, the central housing 113, the right conductive layer 155 (accommodating the zinc material 140) and the right air electrode layer 122 are separately arranged. The separators may allow the electrolyte 170 to pass through.

Figure 1A:
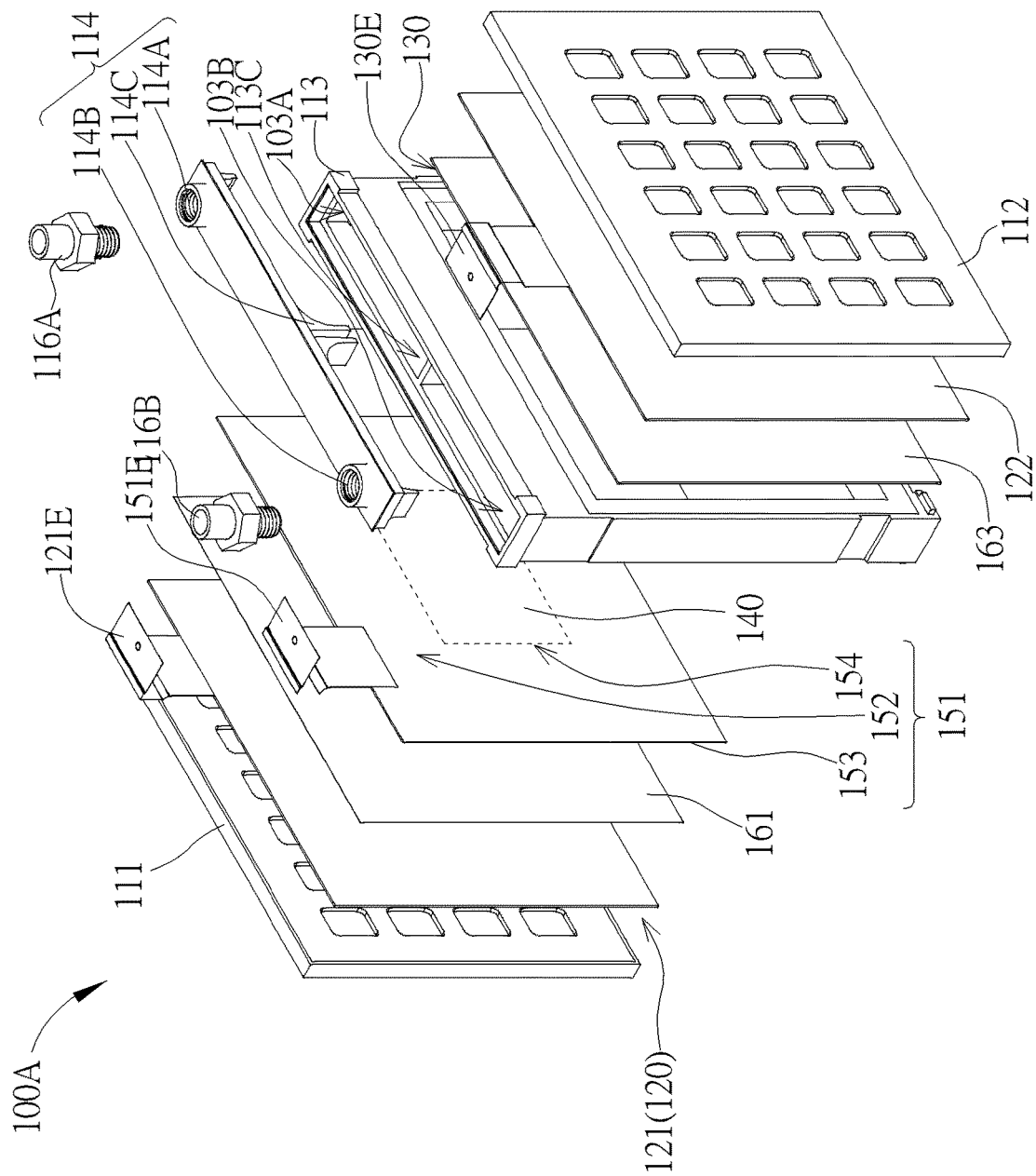
FIG. 1A illustrates a schematic diagram of an explosive view of a variant embodiment corresponding to FIG. 1 of a cell structure of the present invention.

FIG. 1A illustrates a schematic diagram of an explosive view of a variant embodiment corresponding to FIG. 1 of a cell structure of the present invention. FIG. 1A illustrates a simplified cell structure with three electric connectors of the present invention. The cell structure with five electric connectors 100 and the simplified cell structure with three electric connectors 100A may share a common feature of multiple gas chambers for buffering the circulation of a fluid. The main difference between the cell structure with five electric connectors 100 and the simplified cell structure with three electric connectors 100A resides in the optional right air electrode layer 122 and in the optional right conductive layer 155. In addition, the separator 164 may also be optional in the simplified cell structure with three electric connectors 100A.

The simplified cell structure with three electric connectors 100A may be useful for the application of one-sided ventilation. For example, the simplified cell structure may be useful when one side of the cell is attached to a circuit board to limit the possibility of gas exchange. The configuration of one side air electrode may result in a thinner structure and simplify the manufacture process and the molding process. The cell structure with five electric connectors 100 of double side air electrodes is better for more gas exchange to yield higher discharge efficiency.

Figure 2:
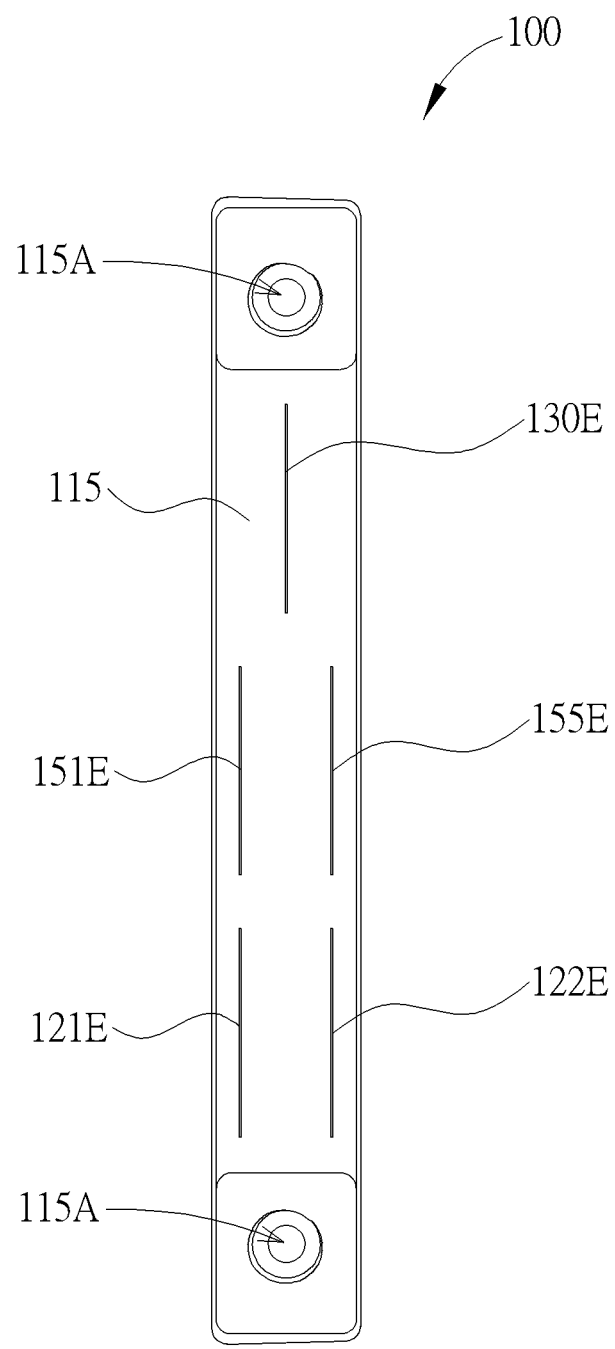
FIG. 2 illustrates a schematic diagram of a side view of an embodiment of the zinc-air fuel cell with five electric connectors corresponding to FIG. 1 of the present invention.

FIG. 2 illustrates a side view of an embodiment of the zinc-air fuel cell with five electric connectors of the present invention. Accordingly, each one of the left discharging positive electric connector 121E, the right discharging positive electric connector 122E, the charging positive electric connector 130E, the left negative electric connector 151E or the right negative electric connector 155E may serve as one electric connector in the five electric connectors of the zinc-air fuel cell of the present invention. Structurally speaking, the left negative electric connector 151E may be disposed between the left discharging positive electric connector 121E and the charging positive electric connector 130E; the right negative electric connector 155E may be disposed between the charging positive electric connector 130E and the right discharging positive electric connector 122E.

Figure 3:
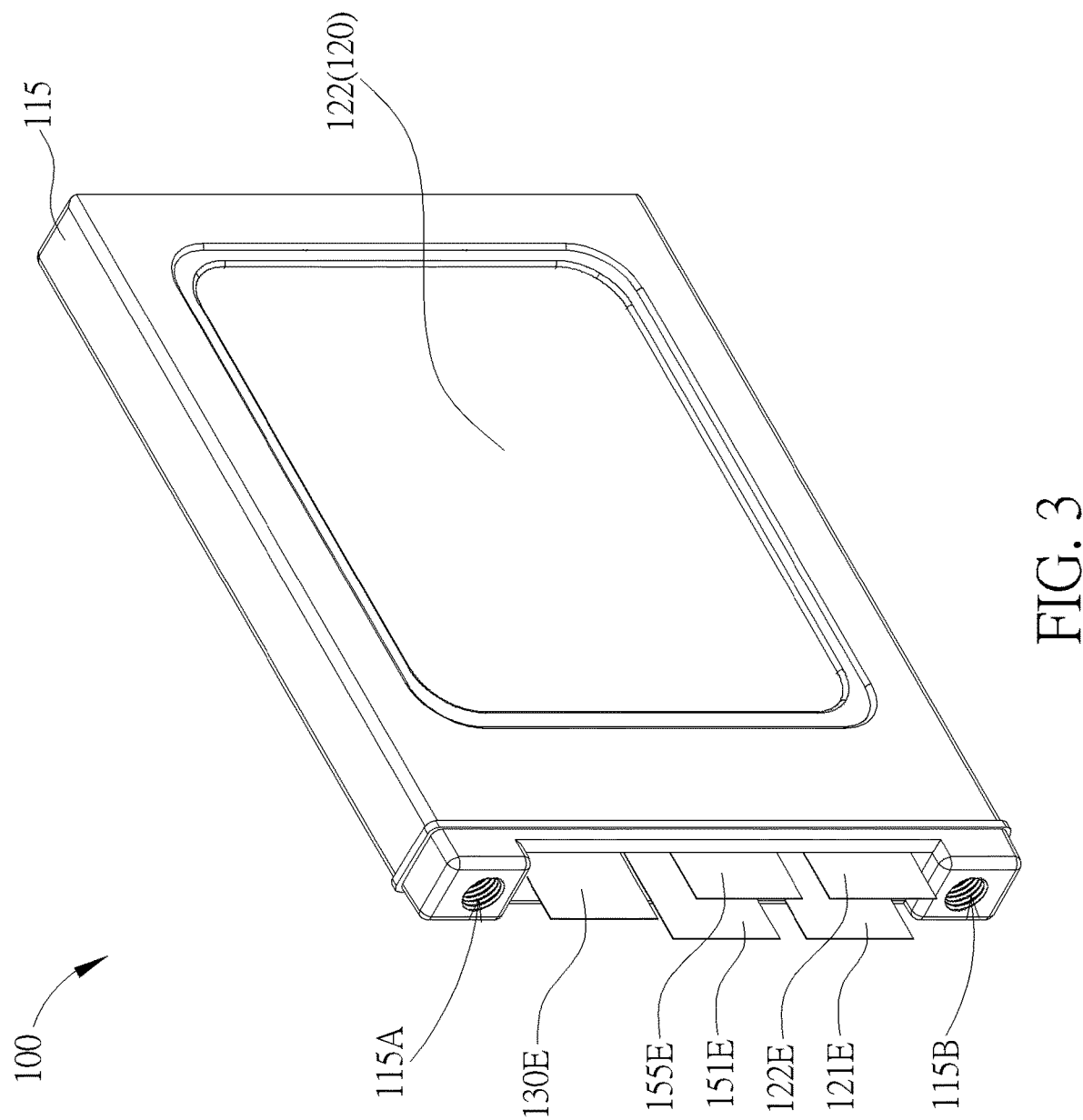
FIG. 3 illustrates a schematic diagram of a perspective view of an embodiment of the zinc-air fuel cell with five electric connectors of the present invention.
Figure 3A:
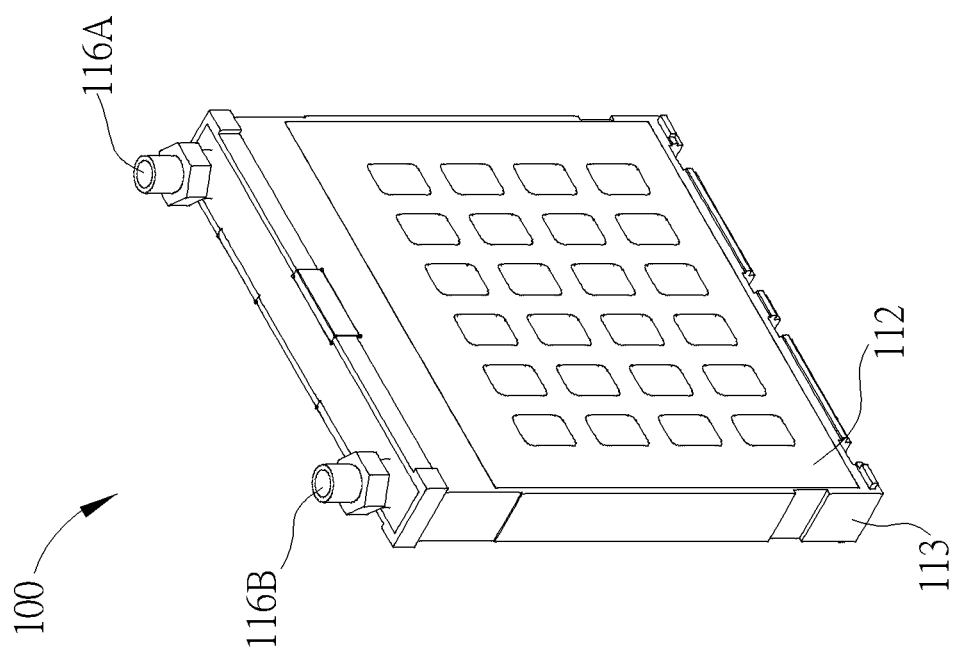
FIG. 3A illustrates another schematic diagram of a simplified perspective view corresponding to FIG. 1A of a cell structure of the present invention in an upright position.
Figure 4A:
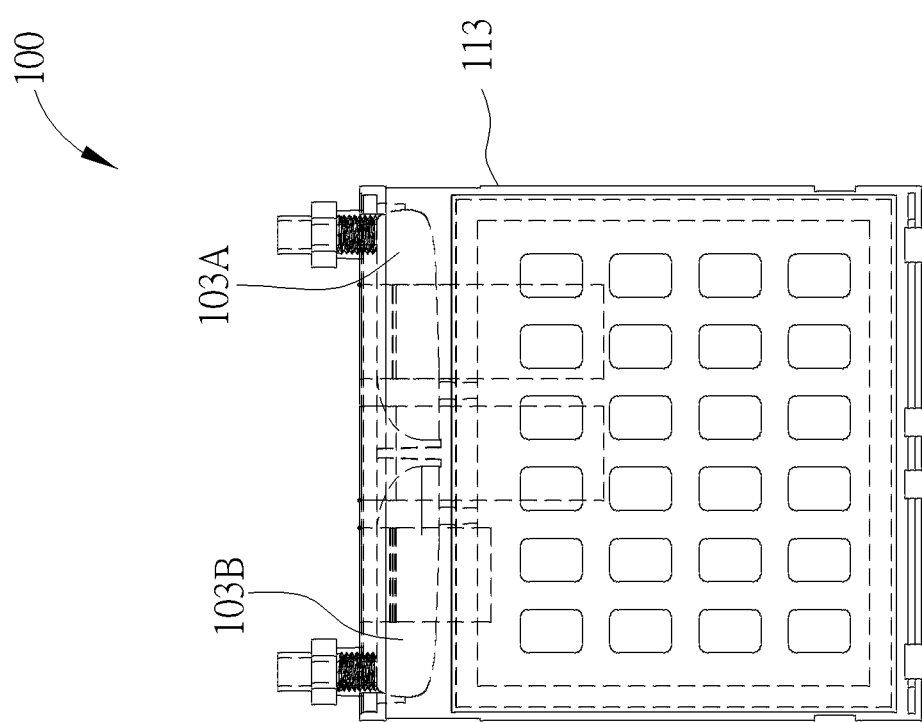
FIG. 4A illustrates another schematic diagram of a simplified front view corresponding to FIG. 1A of a cell structure of the present invention in an upright position.

FIG. 3 illustrates a perspective view of an embodiment of the zinc-air fuel cell with five electric connectors of the present invention. FIG. 4 illustrates a schematic diagram of an embodiment of the zinc-air fuel cell with five electric connectors of the present invention. The first opening 115A or the second opening 115B may allow a fluid to enter or leave the cell structure 100. The fluid may be selected form a group consisting of a gas, an electrolyte and a fuel. There may be some holes on some housing, for example holes 112H on the right housing 112, to help the alignment of molding, for example for use in the insert molding method.

An electrolyte 170 may optionally fill up to the full level 170F or circulate within the first gas chamber 103A, the second gas chamber 103B, the left space 101 and the right space 102, and flow to pass through the separators, such as the separator 161, the separator 162, the separator 163 and the separator 164. The electrolyte 170 may be a liquid electrolyte, such as an electrolytic solution including an aqueous alkaline solution. The aqueous alkaline solution may include an electrolytic solute and a solvent. In some embodiments, the electrolytic solute may include an hydroxide such as potassium hydroxide, and a solvent such as water. The hydrophilic separators, such as those commercially available from Du Pont, may selectively allow polar molecules, such as water molecules, potassium ions and hydroxide ions to pass through, and zinc is not allow to pass through, but the present invention is not limited thereto. The electrolyte 170 may be in contact with at least one of the air electrode layers, of the metal layer 130 and of the zinc material 140 so that the air electrode layers, the zinc material 140 and the metal layer 130 are respectively electrically connected to undergo a discharge reaction or a charge reaction.

Figure 5:
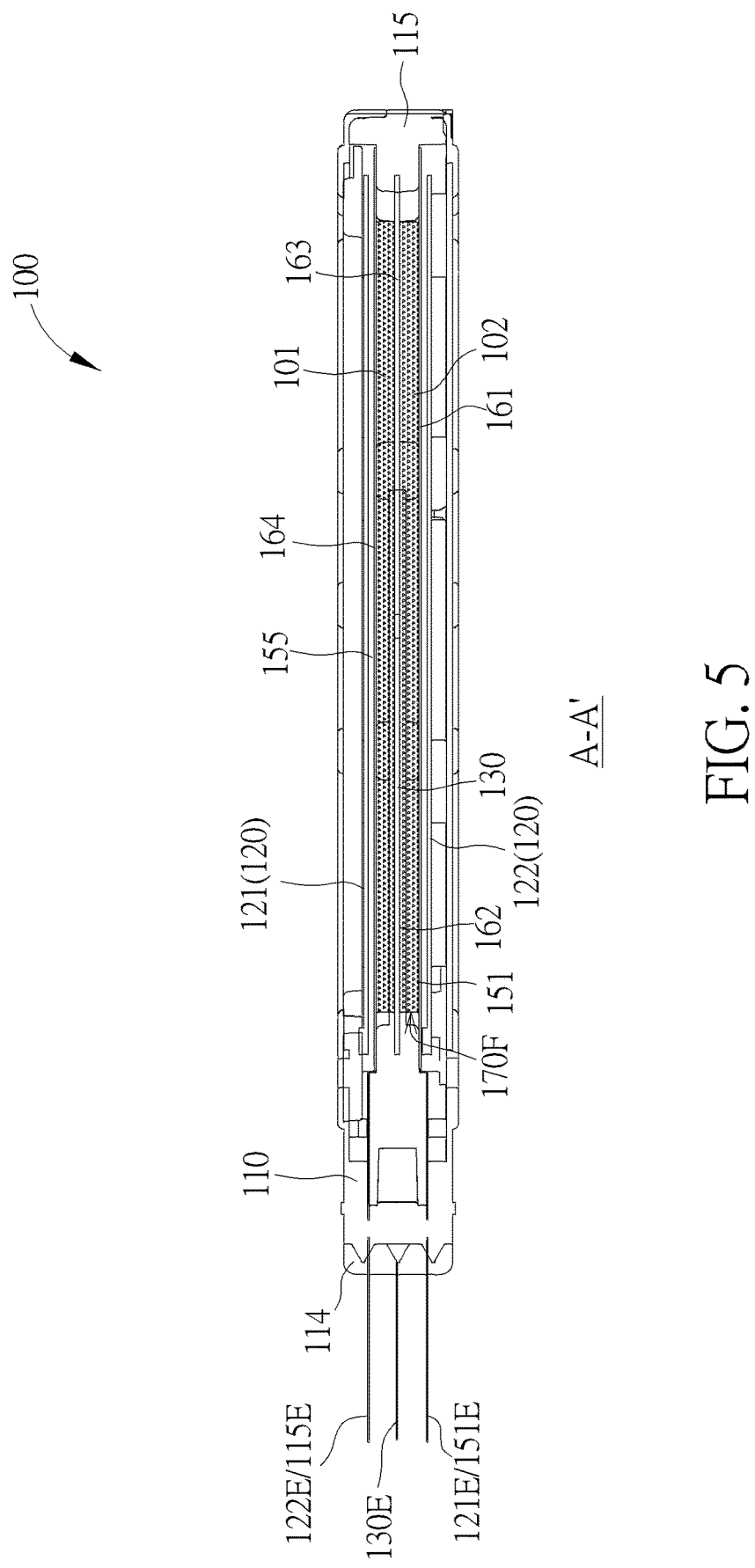
FIG. 5 illustrates a schematic diagram of a cross-sectional view along line A-A' in FIG. 4 of an embodiment of the zinc-air fuel cell with five electric connectors of the present invention in a horizontal position.
Figure 5A:
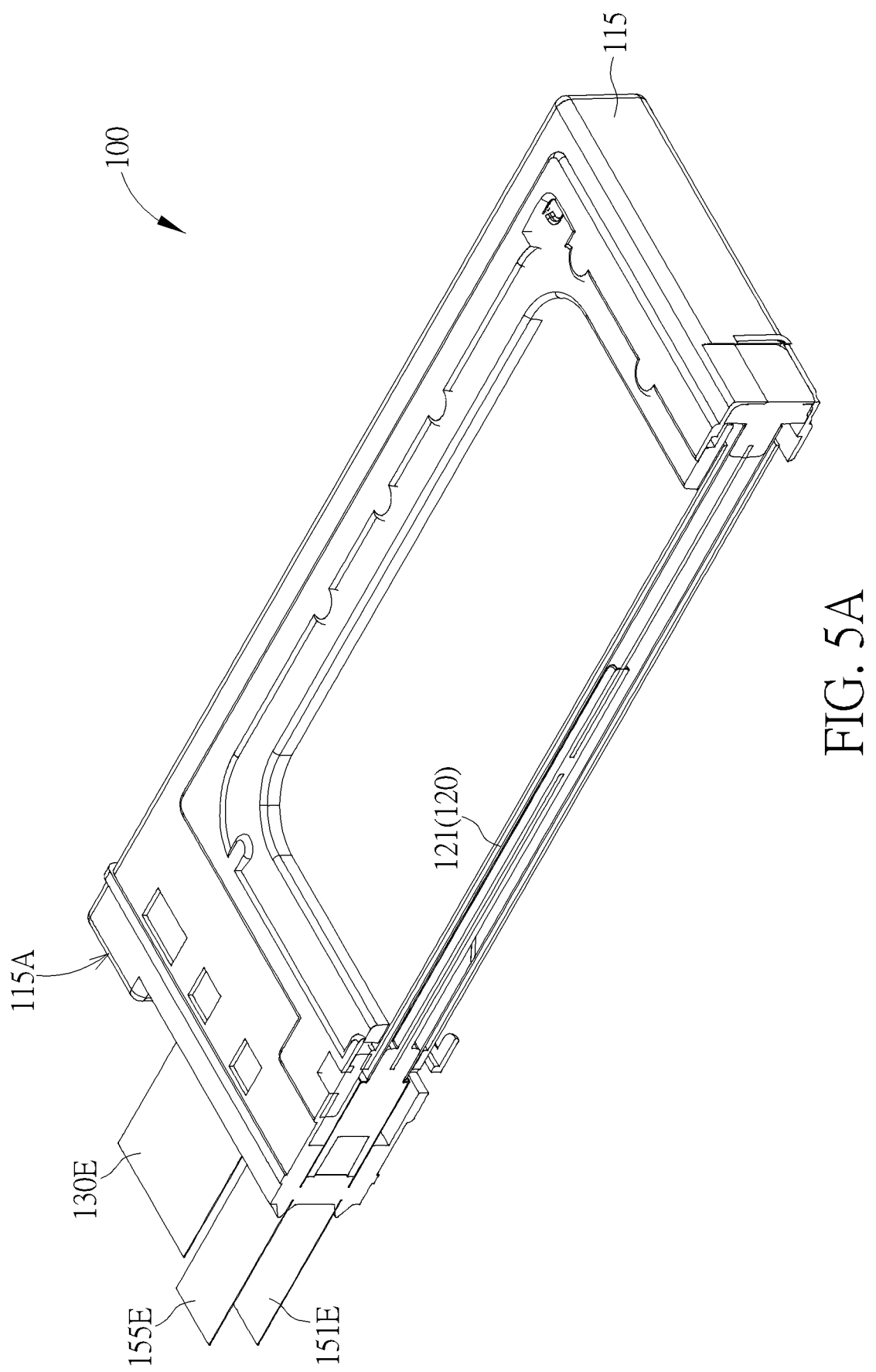
FIG. 5A illustrates a schematic diagram of a perspective view corresponding to FIG. 5 of an embodiment of the zinc-air fuel cell with five electric connectors of the present invention in a horizontal position.

FIG. 5 illustrates a schematic diagram of a cross-sectional view of an embodiment along line A-A' in FIG. 4 of the zinc-air fuel cell with five electric connectors of the present invention in a horizontal position. FIG. 5A illustrates a schematic diagram of a perspective view corresponding to FIG. 5 of an embodiment of the zinc-air fuel cell with five electric connectors of the present invention in a horizontal position. As shown in FIG. 5, the air electrode set 120 including a left air electrode layer 121 and a right air electrode layer 122, the metal layer 130, the zinc material 140 accommodated in the conductive set may be configured to be vertically arranged with respect to a flat surface, i.e. a stacking structure if the flat surface (not shown) for supporting the cell is used as a horizontal reference. For example, the left air electrode layer 121 may be the topmost layer, the zinc material 140 may be the bottommost layer, and the metal layer 130 may be disposed between the left air electrode layer 121 and the zinc material 140. This novel configuration is different from the conventional upright position of lateral arrangement.

The present invention relates to a fuel cell with a zinc material and air to undergo a redox reaction, and in particular the present invention is directed to a zinc-air fuel cell which has an electrolyte and a zinc material at the same time to serve as reactant materials and is electrically connected to other external electronic products through the five electric connectors. The fuel cell may use a polysulfone resin to be packaged by an insert molding/injection molding method to diminish the leakage problem of the prior art. The five-electric-connectors structure may further facilitate the special use of performing two separate electrodes or single charging and charging and discharging at the same time.

The zinc-air fuel cell with five electric connectors of the present invention has the design of three positive electrodes and two negative electrodes so that a single cell itself may undergo a chemical reaction of charge and/or a chemical reaction of discharge at the same time.

Figure 6:
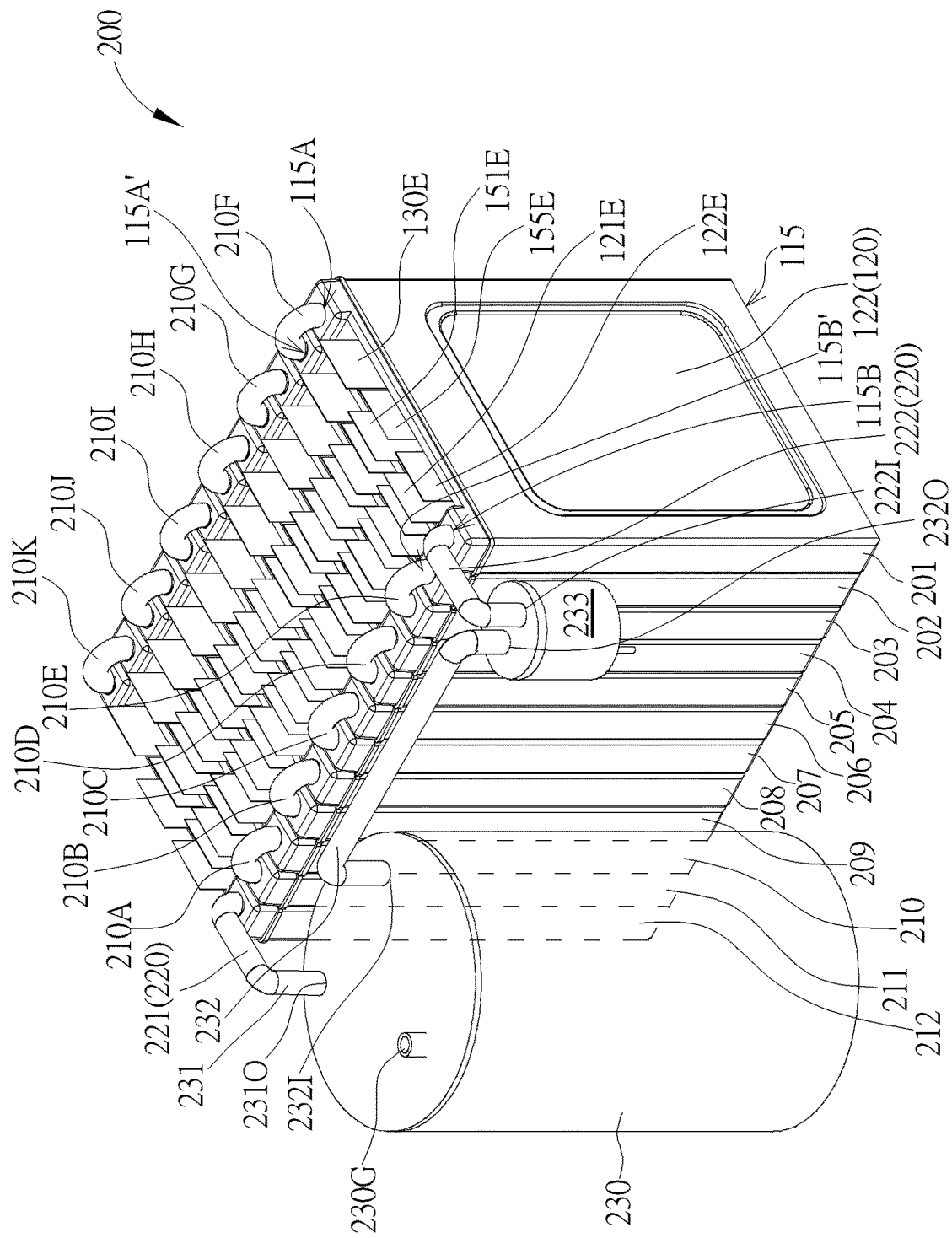
FIG. 6 illustrates a schematic diagram of a perspective view of an embodiment of a cell assembly composed of multiple cell structures which correspond to multiple zinc-air fuel cells with five electric connectors of the present invention.
Figure 6A:
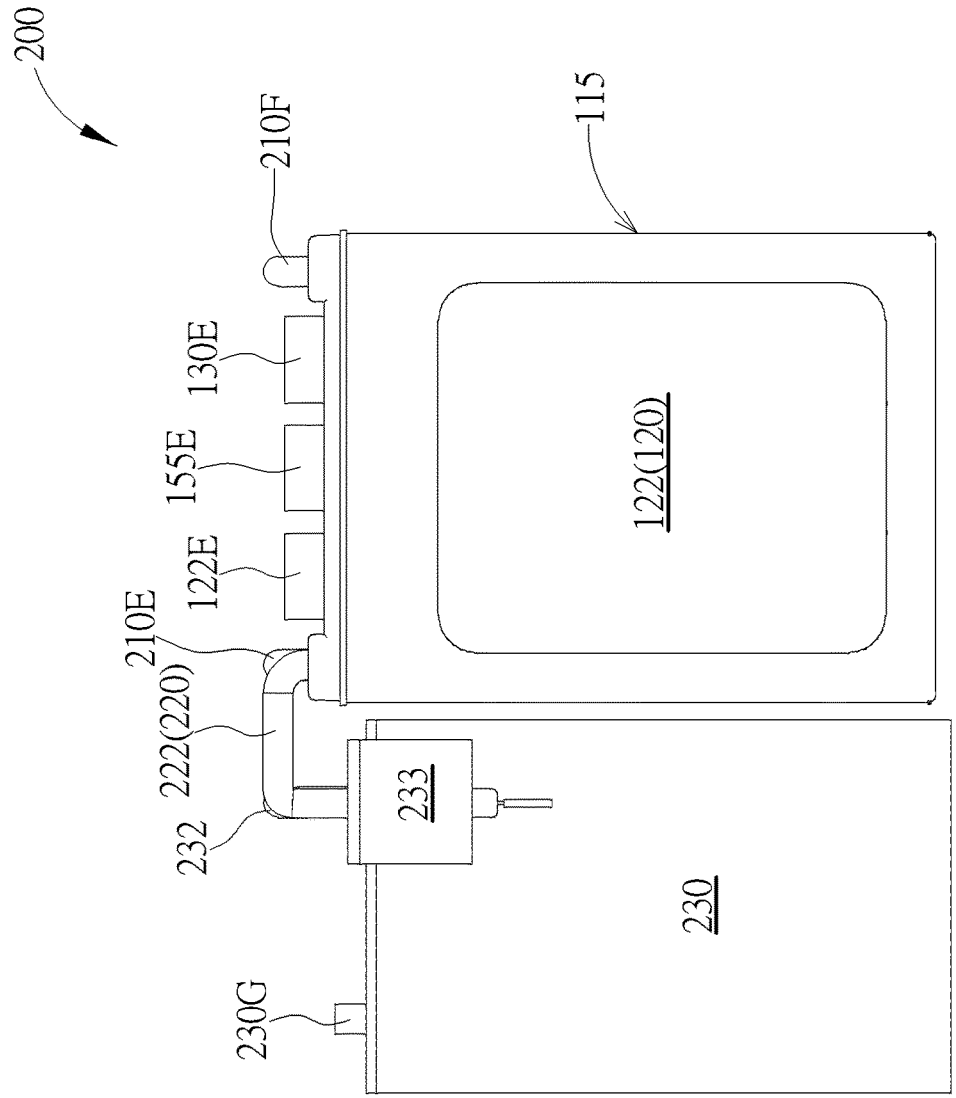
FIG. 6A illustrates a schematic diagram of a side view corresponding to FIG. 6 of the present invention.
Figure 6B:
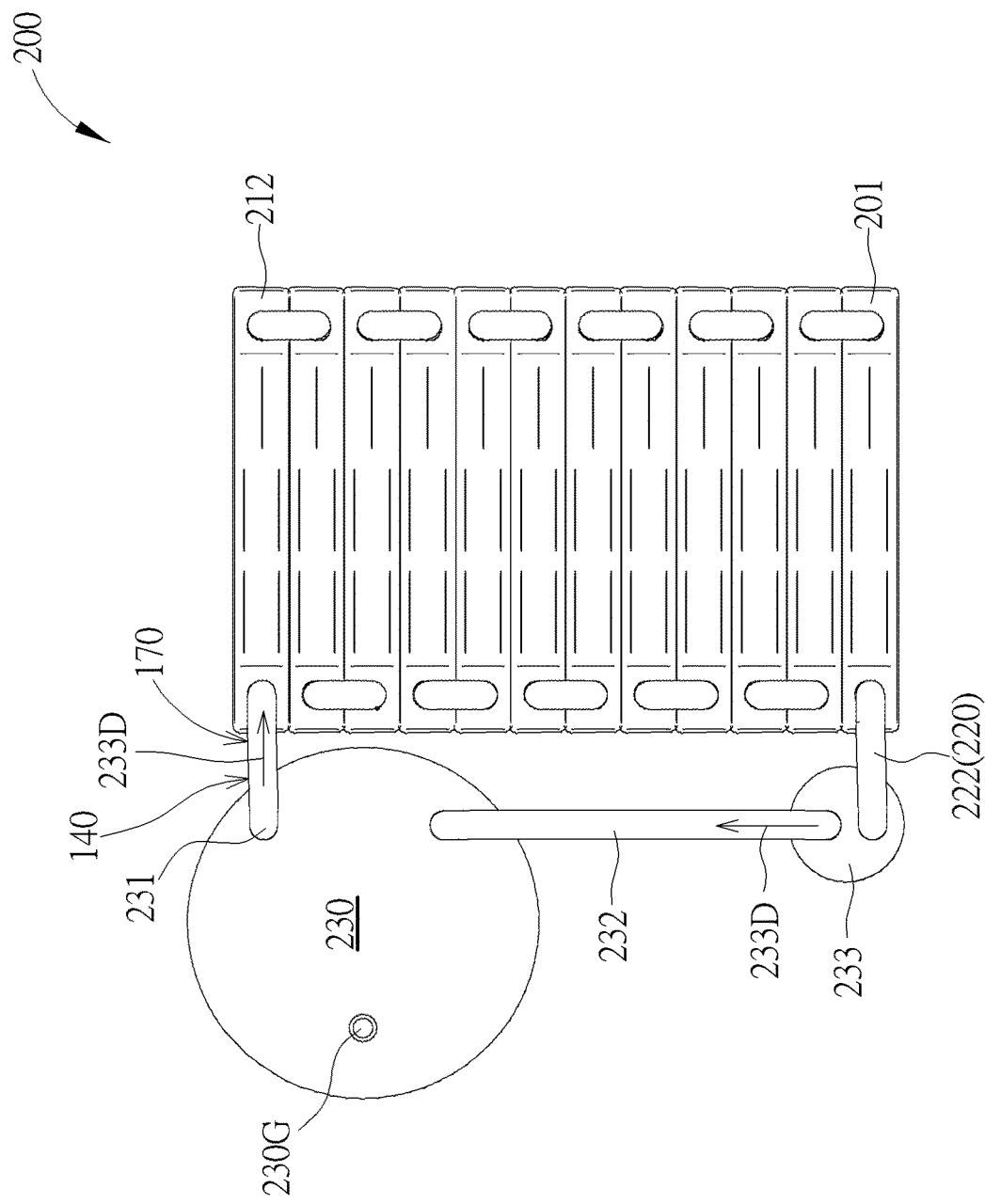
FIG. 6B illustrates a schematic diagram of a top view corresponding to FIG. 6 of the present invention.

FIG. 6 illustrates a schematic diagram of a perspective view of an embodiment of a cell assembly composed of multiple cell structures which correspond to multiple zinc-air fuel cells with five electric connectors of the present invention. FIG. 6A illustrates a schematic diagram of a side view corresponding to FIG. 6 of the present invention. FIG. 6B illustrates a schematic diagram of a top view corresponding to FIG. 6 of the present invention. A cell assembly may include two or more cell structures of the present invention. For example, the cell assembly 200 may include twelve cell structures, such as a cell structure 201, a cell structure 202, a cell structure 203, a cell structure 204, a cell structure 205, a cell structure 206, a cell structure 207, a cell structure 208, a cell structure 209, a cell structure 210, a cell structure 211, a cell structure 212, but the present invention is not limited to this. At least one cell structure in the cell assembly 200 may correspond to the zinc-air fuel cell with five electric connectors of the present invention.

One cell structure, taking the cell structure 201 for example, may include a case housing 115 to accommodate a first opening 115A, a second opening 115B, a right air electrode layer 122 of an air electrode set 120, a left discharging positive electric connector 121E, a right discharging positive electric connector 122E, a charging positive electric connector 130E, a left negative electric connector 151E and a right negative electric connector 155E, but the present invention is not limited to this. Similar numeral references in other cell structures are omitted for simplicity. Please refer to the above descriptions for the details of the cell structures.

The cell structures in the cell assembly 200 may be mutually connected. In some embodiments, one cell structure may be electrically connected to another cell structure in parallel. In some embodiments, one cell structure may be electrically connected to another cell structure in series. Further, the openings in adjacent cell structures may be mutually connected. The adjacent openings may be connected by connecting pipes. For example, two adjacent openings may be connected by a connecting pipe. FIG. 6 illustrates the cell assembly 200 may include a connecting pipe 210A, a connecting pipe 210B, a connecting pipe 210C, a connecting pipe 210D, a connecting pipe 210E, a connecting pipe 210F, a connecting pipe 210G, a connecting pipe 210H, a connecting pipe 210I, a connecting pipe 210J, and a connecting pipe 210K, but the present invention is not limited to these. For example, the second opening 115B of the cell structure 201 and the second opening 115B' of the cell structure 202 are connected by the connecting pipe 210E. Similarly, the first opening 115A of the cell structure 201 and the first opening 115A' of the cell structure 202 are connected by the connecting pipe 210F. Other adjacent openings in the cell structures may be connected in a similar way.

Further, the cell assembly 200 may include a circulation tube set 220 to allow a fluid to be distributed to at least one of the cell structures through the connecting pipes. The fluid may be selected form a group consisting of a gas, an electrolyte and a fuel. For example, the circulation tube set 220 may include a source circulation tube and a drain circulation tube. The source circulation tube may allow a fluid to enter the cell assembly 200 and the drain circulation tube may allow the fluid to leave the cell assembly 200.

FIG. 6 illustrates the cell assembly 200 may include a first circulation tube 221 and a second circulation tube 222. If the first circulation tube 221 is the source circulation tube, the second tube may be the corresponding drain circulation tube. Alternatively, if the first circulation tube 221 is the drain circulation tube, the second tube may be the corresponding source circulation tube. For example, if a fluid enters the cell structure 201 of the cell assembly 200 through the second circulation tube 222, the fluid may first pass through the first gas chamber (not shown), the second gas chamber (not shown), the left space (not shown) and the right space (not shown) of the cell structure 201, then enter the cell structure 202, the cell structure 203, the cell structure 204, the cell structure 205, the cell structure 206, the cell structure 207, the cell structure 208, the cell structure 209, the cell structure 210, the cell structure 211, and the first gas chamber (not shown), the second gas chamber (not shown), the left space (not shown) and the right space (not shown) of the cell structure 212, then leave the cell assembly 200 through the first circulation tube 221 of the cell structure 212, but the present invention is not limited to these.

Additionally, the cell assembly 200 may be equipped with one or more regulating devices to facilitate the regulation and/or circulation of the fluid in least one of the cell structures and/or between at least one of the cell structures through the connecting pipes. For example, the regulating device may include a fuel tank 230 and a circulating pump 233, but the present invention is not limited to this. The circulating pump 233 may serve as a transport device to facilitate the circulation of the fluid, or the regulation of the volume of the fluid to be distributed in the cell assembly 200, but the present invention is not limited to this. The fuel tank 230 may provide the cell assembly 200 with chemicals, for example the electrolyte, the zinc material and the combination thereof to buffer the chemical reactions.

In some embodiments, the cell structure 100 of the present invention may further include an optional transport device such as the circulating pump 233. The optional circulating pump 233 may help regulate the presence or the absence of the electrolyte 170 in the cell structure 100, or further assist to activate the predetermined chemical reaction or to deactivate the predetermined chemical reaction. In the absence of sufficient electrolyte 170 in the cell structure 100, the predetermined chemical reaction may be optionally ceased or significantly deactivated as much as possible to overcome the problems in the conventional cells or in the conventional batteries. The input or the output of a fluid which may be regulated by circulating pump 233 may change the height of the electrolyte 170 in at least one of the spaces, so that the electrolyte 170 may contact different elements in at least one of the spaces to accordingly change the status of the cell structure 100 of the present invention. This is one of the features of the cell structure 100 of the present invention.

The transport device may be connected to the spaces or to the gas chambers to regulate the entry or the departure of fluids, for example to regulate the entry or the departure of the gas and/or the electrolyte 170. Further, the transport device may regulate a height of the electrolyte 170 in the spaces. The height may enable the contact of the electrolyte 170 with the air electrode set 120 such as the left air electrode layer 121 or the right air electrode layer 122, with the metal layer 130 or with the zinc material 140 to determine the activation or the deactivation of the pre-determined chemical reaction. This approach may avoid the undesirable self-discharging or charging reaction of the zinc-air fuel cell with five electric connectors of the present invention when the cell structure 100 is in storage or not in use, and further avoid the corruption or surface peeling of the internal structure in the spaces so as to extend the storage life or the service life of the zinc-air fuel cell with five electric connectors of the present invention.

In some embodiments, the transport device may regulate the input of the electrolyte 170 into the left space 101 and into the right space 102 through the first gas chamber 103A and/or the second gas chamber 103B if the first gas chamber 103A, the second gas chamber 103B, the left space 101 and the right space 102 are mutually connected. For example, the transport device may provide the cell structure 100 with at least one of the zinc material 140 and the electrolyte 170 in a controlled condition to increase the volume of the electrolyte 170 in the cell structure 100, optionally may be up to the full level 170F (shown in FIG. 4). The increase of the volume of the electrolyte 170 results in the increase of the height of the electrolyte 170 in the left space 101 and in the right space 102.

In some embodiments, the transport device may regulate the output of at least one of the zinc material 140 and the electrolyte 170 from the left space 101 and the right space 102 through the first gas chamber 103A and/or the second gas chamber 103B if the first gas chamber 103A, the second gas chamber 103B, the left space 101 and the right space 102 are mutually connected. For example, the transport device may drain at least one of the zinc material 140 and the electrolyte 170 out of the cell structure 100 in a controlled condition to decrease the volume of at least one of the zinc material 140 and the electrolyte 170 in the cell structure 100. The decrease of the volume of the electrolyte 170 may result in the decrease of the height of the electrolyte 170 in the left space 101 and in the right space 102.

In some embodiments, the transport device may regulate the input of the gas into the left space 101 and into the right space 102 through the first gas chamber 103A and/or the second gas chamber 103B if the first gas chamber 103A, the second gas chamber 103B, the left space 101 and the right space 102 are mutually connected. The gas may include at least one of oxygen and air. For example, the transport device may provide the cell structure 100 with the gas in a controlled condition to facilitate the activation or the continuation of the pre-determined chemical reaction.

In some embodiments, the transport device may regulate the output of the gas from the left space 101 and from the right space 102 through the first gas chamber 103A and/or the second gas chamber 103B if the first gas chamber 103A, the second gas chamber 103B, the left space 101 and the right space 102 are mutually connected. The gas may include at least one of oxygen, air, oxygen-poor air and oxygen-depleted air. For example, the transport device may expel the gas from the cell structure 100 in a controlled condition to facilitate the continuation, the deactivation or the suppression of the pre-determined chemical reaction.

In some embodiments, the height of the electrolyte 170 may regulate the status of the cell structure 100 of the present invention. The status may include the activation of a charge reaction, the activation of a discharge reaction, the deactivation of the discharge reaction and the deactivation of a pre-determined chemical reaction.

For example, the cell structure 100 may be activated for a discharge reaction when the height of the electrolyte 170 enables the electrolyte 140 in contact with the air electrode set 120 such as the left air electrode layer 121 or the right air electrode layer 122, with the metal layer 130 and with the zinc material 140 simultaneously.

For example, the cell structure 100 may be activated for a charge reaction when the height of the electrolyte 170 enables the electrolyte 170 in contact with the air electrode set 120 such as the left air electrode layer 121 or the right air electrode layer 122, with the metal layer 130 and with the zinc material 140 simultaneously.

For example, the cell structure 100 may be activated for a discharge reaction when the height of the electrolyte 170 enables the electrolyte 170 in contact with the air electrode set 120 such as the left air electrode layer 121 or the right air electrode layer 122, and with the zinc material 140 simultaneously.

For example, the cell structure 100 may be activated for a charge reaction when the height of the electrolyte 170 makes the electrolyte 170 in contact with the metal layer 130 and with the zinc material 140 simultaneously.

For example, the cell structure 100 may be deactivated for a chemical reaction when the electrolyte 170 is in exclusive contact with only one of the air electrode set 120 such as the left air electrode layer 121 or the right air electrode layer 122, the metal layer 130 and the zinc material 140.

The present invention may enable the input or the output of at least one of the zinc material 140 and the electrolytic solution 170 through a transport device into or out of the zinc-air fuel cell with multiple electric connectors of the present invention so as to promote the replacement or the renewal operation process of the zinc material 140 or of the electrolytic solution 170 to double the efficiency of the operation process.

The zinc-air fuel cell with multiple electric connectors of the present invention may improve the reaction efficiency and charge and discharge performance of the fuel cell.

In some embodiments, the fuel tank 230 may have a gas hole 230G, a fuel outlet 231O, and a fuel inlet 232I. The gas hole 230G may facilitate to balance the gas pressure in the fuel tank 230. For example, excess gas in the fuel tank 230 may be discharged through the gas hole 230G. The fuel outlet 231O may be connected to a fuel pipe 231 which is connected to the first circulation tube 221. The fuel inlet 232I may be connected to another fuel pipe 232 which is connected to the circulating pump 233.

In some embodiments, the circulating pump 233 may have a fuel outlet 232O, and a fuel inlet 222I. The fuel outlet 232O may be connected to the fuel pipe 232 which is connected to the fuel inlet 232I. The fuel inlet 222I may be connected to the second circulation tube 222. The electrolyte and/or the zinc material may enter the first circulation tube 221 of the cell assembly 200 from the fuel outlet 231O of the fuel tank 230 along the circulation direction 233D through the fuel pipe 231. The electrolyte and/or the zinc material may enter the fuel inlet 222I of the circulating pump 233 from the second opening 115B of the cell assembly 200 along the circulation direction 233D through the second circulation tube 222. The electrolyte and/or the zinc material may return to the fuel inlet 232I of the fuel tank 230 from the fuel outlet 232O of the circulating pump 233 through the fuel pipe 232 to complete the overall circulation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A zinc-air fuel cell with multiple electric connectors, comprising:
   a case forming a space that is internal to the zinc-air fuel cell;
   a plurality of gas chambers disposed in the space;
   two air electrode layers disposed in the space and serving as positive electrodes for discharging in a chemical reaction;
   a metal layer disposed in the space and serving as a positive electrode for charging in the chemical reaction;
   a zinc material disposed in the space and serving as a negative electrode to go with the air electrode layers for discharging in the chemical reaction or a negative electrode to go with the metal layer for charging in the chemical reaction;
   a plurality of separators disposed in the space, respectively disposed between the air electrode layers and the metal layer so that the air electrode layers, the zinc material and the metal layer are separately arranged; and
   an electrolyte disposed in the space, the electrolyte capable of flowing to pass through the separators and in contact with the air electrode layers, with the metal layer and with the zinc material so that the air electrode layers, the zinc material and the metal layer are respectively electrically connected, wherein the electrolyte is disposed in the space via at least one of the plurality of gas chambers that are configured to pass but not to hold the electrolyte, and wherein the electrolyte is disposed in the space up to a level that is located lower than the plurality of gas chambers.

2. The zinc-air fuel cell with multiple electric connectors of claim 1, wherein the case comprises a polyarylsulfone material and is formed by an insert molding method to prevent the electrolyte from leaking.

3. The zinc-air fuel cell with multiple electric connectors of claim 1, further comprising:
a transport device connected to the space to regulate a height of the electrolyte in the space.

4. The zinc-air fuel cell with multiple electric connectors of claim 3, wherein the transport device regulates either or both of input of the electrolyte into the space and output of the electrolyte from the space.

5. The zinc-air fuel cell with multiple electric connectors of claim 3, wherein the transport device regulates either or both of input and output of a gas into the space.

6. The zinc-air fuel cell with multiple electric connectors of claim 3, wherein the zinc-air fuel cell with multiple electric connectors is activated for a charge reaction or for a discharge reaction when the height enables the electrolyte in contact with the air electrode layers, with the metal layer and with the zinc material simultaneously.

7. The zinc-air fuel cell with multiple electric connectors of claim 3, wherein the zinc-air fuel cell with multiple electric connectors is activated for a discharge reaction when the height enables the electrolyte in contact with the air electrode layers and with the zinc material simultaneously.

8. The zinc-air fuel cell with multiple electric connectors of claim 3, wherein the zinc-air fuel cell with multiple electric connectors is activated for a charge reaction when the height enables the electrolyte in contact with the metal layer and with the zinc material simultaneously.

9. The zinc-air fuel cell with multiple electric connectors of claim 1, wherein the zinc-air fuel cell with multiple electric connectors is deactivated for a chemical reaction when the electrolyte is in contact with one of the air electrode layers, the metal layer and the zinc material.

10. The zinc-air fuel cell with multiple electric connectors of claim 1, wherein the gas chambers buffer a circulation of a gas or the electrolyte.

11. The zinc-air fuel cell with multiple electric connectors of claim 1, further comprising:
two conductive layers, disposed on two sides of the space to be adjacent to and in contact with the zinc material to accommodate the zinc material.

12. The zinc-air fuel cell with multiple electric connectors of claim 11, wherein at least one of the conductive layers has a peripheral region and a central region, and wherein the central region is lower than the peripheral region to form a recess to accommodate the zinc material.

13. The zinc-air fuel cell with multiple electric connectors of claim 1, wherein the zinc material comprises flowable zinc slurry, zinc particles or a zinc plate.

14. The zinc-air fuel cell with multiple electric connectors of claim 1, wherein the air electrode layers comprise a first air electrode layer and a second air electrode layer, and wherein the first air electrode layer, the metal layer, the zinc material and the second air electrode layer are vertically arranged.

15. The zinc-air fuel cell with multiple electric connectors of claim 14, wherein the first air electrode layer is a topmost layer, the zinc material is a bottommost layer, and the metal layer is disposed between the first air electrode layer and the zinc material.

16. The zinc-air fuel cell with multiple electric connectors of claim 1, wherein the zinc material comprises a first negative electrode and a second negative electrode, wherein the air electrode layers comprise a first positive electrode and a second positive electrode, and wherein the first negative electrode and the second negative electrode are disposed between the first positive electrode and the second positive electrode for charging in the chemical reaction.

17. The zinc-air fuel cell with multiple electric connectors of claim 1, wherein the plurality of gas chambers are mutually connected.

18. The zinc-air fuel cell with multiple electric connectors of claim 1, further comprising:
one or more guide columns, each disposed between two adjacent gas chambers of the plurality of gas chambers to guide a circulation of at least one of the zinc material, the electrolyte, and a gas.

19. The zinc-air fuel cell with multiple electric connectors of claim 1, wherein the plurality of gas chambers are configured to balance an internal pressure of the zinc-air fuel cell.

20. The zinc-air fuel cell with multiple electric connectors of claim 1, wherein each of the air electrode layers comprises a metal mesh, a waterproof and breathable layer and a catalytic layer.

* * * * *